US010896146B2

(12) United States Patent
Swaminathan et al.

(10) Patent No.: US 10,896,146 B2
(45) Date of Patent: Jan. 19, 2021

(54) RELIABILITY-AWARE RUNTIME OPTIMAL PROCESSOR CONFIGURATION

(71) Applicant: INTERNATIONAL BUSINESS MACHINES CORPORATION, Armonk, NY (US)

(72) Inventors: Karthik V. Swaminathan, Mount Kisco, NY (US); Ramon Bertran Monfort, New York, NY (US); Alper Buyuktosunoglu, White Plains, NY (US); Pradip Bose, Yorktown Heights, NY (US); Nandhini Chandramoorthy, Yorktown Heights, NY (US); Chen-Yong Cher, Port Chester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 16/194,247

(22) Filed: Nov. 16, 2018

(65) Prior Publication Data

US 2020/0159691 A1 May 21, 2020

(51) Int. Cl.
*G06F 15/78* (2006.01)
*G06F 1/26* (2006.01)

(52) U.S. Cl.
CPC ............ *G06F 15/7867* (2013.01); *G06F 1/26* (2013.01)

(58) Field of Classification Search
CPC .... G06F 1/3203; G06F 1/3287; G06F 1/3296; G06F 1/3206

USPC ................................................. 713/320–324
See application file for complete search history.

(56) References Cited

U.S. PATENT DOCUMENTS

| 8,276,018 B2 * | 9/2012 | Kursun ................. G06F 11/008 |
| | | 714/10 |
| 8,788,871 B2 | 7/2014 | Krishnamurthy et al. |

(Continued)

OTHER PUBLICATIONS

Miller, T. et al., "Flexible Error Protection for Energy Efficient Reliable Architectures", in Proceedings of 22nd International Symposium on Computer Architecture and High Performance Computing (SBAC-PAD), pp. 1-8, 2010.

(Continued)

*Primary Examiner* — Brian T Misiura
(74) *Attorney, Agent, or Firm* — Intelletek Law Group, PLLC; Gabriel Daniel, Esq.

(57) ABSTRACT

A system and method for determining reliability-aware runtime optimal processor configuration can integrate soft and hard error data into a single metric, referred to as the balanced reliability metric (BRM), by using statistical dimensionality reduction techniques. The BRM can be used to not only adjust processor voltage to optimize overall reliability but also to adjust the number of on-cores to further optimize overall processor reliability. In some implementations, both coarse-grained actuations, based on optimal core count, and fine-grained actuations, based on optimal processor voltage ($V_{dd}$), may be used, where feedback control can recursively re-compute soft and hard error data based on a new configuration, until convergence at an optimal configuration.

17 Claims, 8 Drawing Sheets

(56) References Cited

U.S. PATENT DOCUMENTS

| | | | |
|---|---|---|---|
| 8,949,659 B2* | 2/2015 | Sainath | G06F 11/073 714/3 |
| 9,081,501 B2* | 7/2015 | Asaad | G06F 15/76 |
| 9,594,615 B2* | 3/2017 | Shur | G06F 11/076 |
| 9,690,555 B2 | 6/2017 | Monfort et al. | |
| 2011/0271141 A1* | 11/2011 | Kursun | G06F 11/0793 714/6.3 |
| 2013/0009761 A1 | 1/2013 | Horseman et al. | |
| 2013/0086395 A1 | 4/2013 | Liu | |
| 2015/0106640 A1 | 4/2015 | Brackman et al. | |
| 2015/0134995 A1 | 5/2015 | Park et al. | |
| 2016/0092284 A1* | 3/2016 | Shur | G06F 11/073 714/704 |

OTHER PUBLICATIONS

Zhang, Y. et al., "A Unified Approach for Fault Tolerance and Dynamic Power Management in Fixed-Priority Real-Time Embedded Systems", in the IEEE Transactions on Computer-Aided Design of Integrated Circuits and Systems, vol. 25, No. 1, pp. 111-125, 2006.

Zhao, B. et al., "Reliability-Aware Dynamic Voltage Scaling for Energy-Constrained Real-Time Embedded Systems", In Proceedings of the IEEE International Conference on Computer Design (ICCD), pp. 633-639, 2008.

Anonymous, IP.com Number: IPCOM000243653D, "Enhanced System Debugging Based on Processor Configuration Tools", Oct. 7, 2015, 7 pgs.

Anonymous, IP.com Number: IPCOM000236928D, "A System and Method for Smart Workload Management on Asymmetric Multicore Architectures", May 22, 2014, 7 pgs.

Rahmani, A. M. et al., "Reliability-Aware Runtime Power Management for Many-Core Systems in the Dark Silicon Era", IEEE Transactions on Very Large Scale Integration (VLSI) Systems, vol. 25, No. 2, Feb. 2017, 14 pgs.

Zhang, Y. et al., "Design configuration selection for Hard-Error reliable Processors via Statistical Rules", Microprocessors and Microsystems (2014); vol. 38, pp. 22-30.

* cited by examiner

RELIABILITY-AWARE RUNTIME OPTIMAL PROCESSOR CONFIGURATION

STATEMENT REGARDING FEDERALLY SPONSORED RESEARCH OR DEVELOPMENT

This application was made with government support under HR0011-13-C-0022 awarded by Defense Advanced Research Projects Agency (DARPA). The government has certain rights to this invention.

BACKGROUND

Technical Field

The present disclosure generally relates to systems and methods for optimizing processor configurations, and more particularly, to a system and method for determining reliability-aware runtime optimal processor configuration.

Description of the Related Art

Energy efficiency has become one of the primary metrics of choice when determining the operating configuration in a processor. A purely energy design optimal design, or energy delay product (EDP) design, can have adverse implications for system reliability. The opposing effects of radiation-induced soft errors and aging-induced hard errors, with increasing voltage, provides dueling design considerations for determining the operating configuration in a processor.

SUMMARY

According to an embodiment of the present disclosure, a method for determining a reliability-aware runtime optimal configuration for a processor includes integrating soft error data and hard error data into a single metric within a metric module and adjusting at least one of a processor voltage and a number of on-cores to optimize overall reliability of the processor.

In some embodiments, the metric module uses a statistical dimensionality reduction technique to convert a combined input of the soft error data and the hard error data into a reduced dimensional array.

In some embodiments, the metric module uses a norm Euclidean distance calculation to determine the single metric.

In some embodiments, the method further includes re-computing the single metric based on the adjusting of at least one of the processor voltage and the number of on-cores and a re-computation of the soft error data and the hard error data.

In some embodiments, the method further includes selecting a minimum value of the single metric to determine an optimal processor voltage to optimize reliability.

In some embodiments, the method further includes performing a coarse-grained actuation by adjusting the number of on-cores based on operating system level metrics and sensor data, recomputing the single metric to determine a recomputed single metric, and performing a fine-grained actuation by adjusting the processor voltage based on operating system level metrics and sensor data.

In some embodiments, the method further includes recalculating the single metric and comparing the recomputed single metric with the recalculated single metric, and, if different, repeating the coarse-grained actuation and the fine-grained actuation.

According to another embodiment of the present disclosure, a method for determining a reliability-aware runtime optimal configuration for a processor includes integrating soft error data and hard error data into a single metric within a metric module, performing a coarse-grained actuation by adjusting the number of on-cores based on operating system level metrics and sensor data, recomputing the single metric to determine a recomputed single metric and performing a fine-grained actuation by adjusting the processor voltage based on operating system level metrics and sensor data.

According to a further embodiment of the present disclosure, a computer program product for determining a reliability-aware runtime optimal configuration for a processor includes a computer readable storage medium having program instructions embodied therewith, the program instructions executable by a balanced reliability metric module to cause the balanced reliability metric module to integrate soft error data and hard error data into a single metric, and adjust at least one of a processor voltage and a number of on-cores to optimize overall reliability of the processor.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, wellknown methods, procedures, components, and/or circuitry have been described at a relatively high-level, without detail, in order to avoid unnecessarily obscuring aspects of the present teachings.

The present disclosure generally relates to a system and method for integrating soft and hard error data into a single metric, referred to as the balanced reliability metric (BRM), by using statistical dimensionality reduction techniques. The BRM can be used to not only adjust processor voltage to optimize overall reliability but also to adjust the number of on-cores to further optimize overall processor reliability. In some implementations, both coarse-grained actuations, based on optimal core count, and fine-grained actuations, based on optimal processor voltage (Vat') may be used, where feedback control can recursively re-compute soft and hard error data based on a new configuration, until convergence at an optimal configuration.

The soft error (SER) data may be obtained, for example, from a soft error experiment (offline error injection) that provides circuit, micro-architecture and application-level derating information, which can be fed to the BRM controller through a register. It may be possible to integrate Qcnt detection circuits to obtain runtime SER data. Hard errors can be provided through power proxy and thermal/aging sensors, such as ring oscillators, for example, which can be fed to the BRM controller in real time at an interval. Power gating and frequency and usage information can be fed to the BRM controller from the operating system. The BRM controller uses the above information to create the balanced reliability metric. Based on the BRM, the system can select the optimal number of on-cores based on the specific performance/power constraints, such as application specific minimum performance and power budget provided through a lookup table, and then recomputes the BRM. Based on this newly computed BRM, the system selects the optimal $V_{dd}$, based on a lookup table, and recomputes the new reliability metrics and BRM. This process is continued until the system converges to an optimal $V_{dd}$ and on-core count. Details of this process are provided in the paragraphs that follow.

Figure 1:
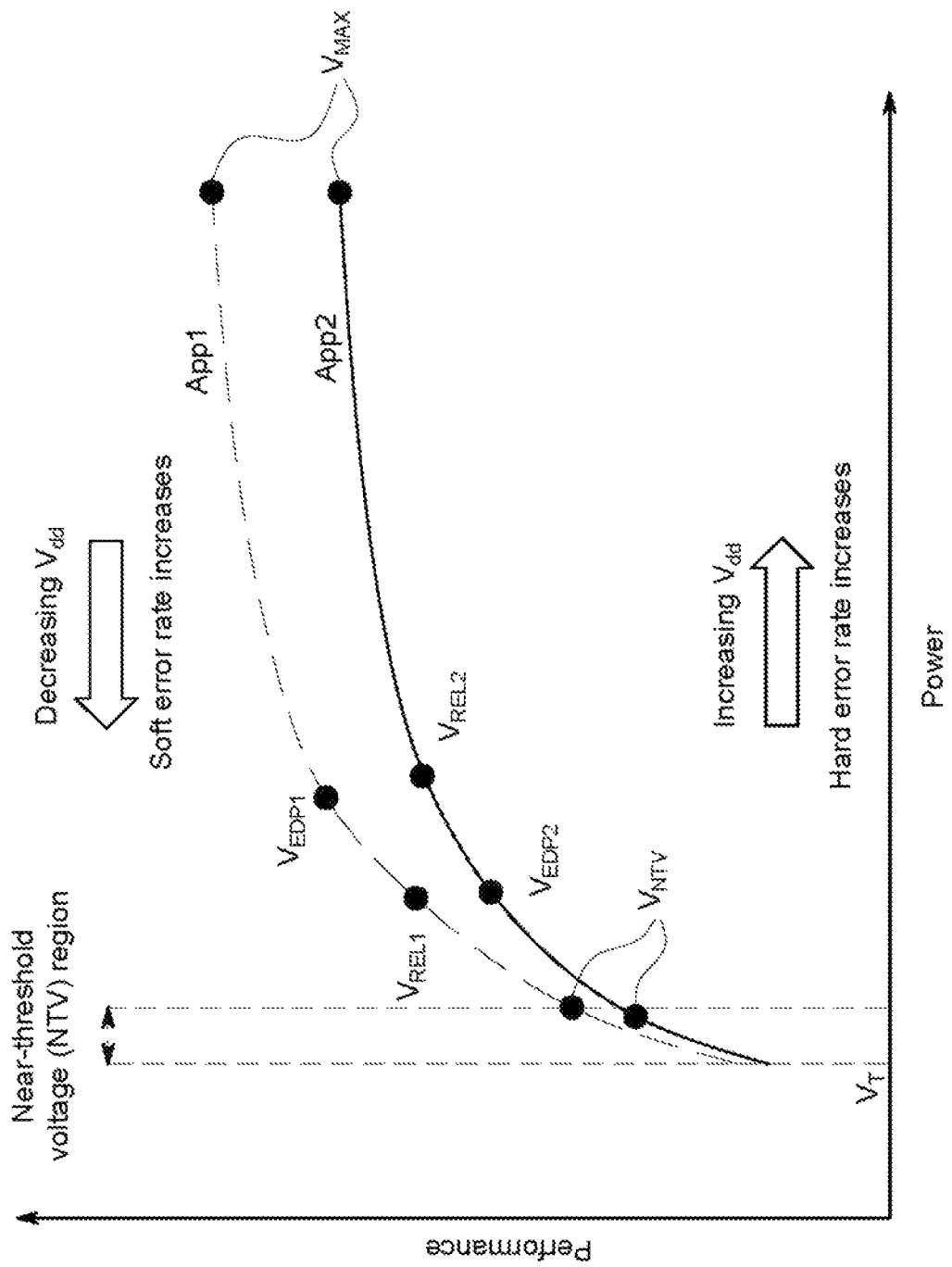
FIG. 1 is a graph illustrating performance over increasing power for two different applications.

Referring to FIG. 1, power and performance is shown for two applications, App1 and App2. A purely energy optimal design, such as those in the near-threshold voltage (NTV) region, is shown as $V_{NTV}$. At this processor power level, it can be seen how system reliability performance may be adversely affected. For a given application, App1, there may be various optimal points, such as the optimal reliability point, $V_{REL}$, optimal energy efficiency point, $V_{EDP}$ and optimal performance point $V_{MAX}$. Depending on the specific application, an optimal reliability point for one application, $V_{REL1}$, may use less power than the optimal energy efficiency point for the same application, $V_{EDP1}$. The inverse may be the case for a second application, App2, as shown in FIG. 1, where $V_{EDP2}$ is at a lower power consumption as compared to $V_{REL2}$.

Due to opposing effects of radiation-induced soft errors and aging-induced hard errors, such as electro-migration (EM), time dependent dielectric breakdown (TDDB) and negative bias temperature instability (NBTI), with increasing voltage, it is possible to determine a reliability-aware optimal $V_{dd}$ under the specified performance and power constraints for a given application. This motivates the need for an apparatus that tunes the processor configuration at runtime, depending on on-chip sensor data, to optimize power-performance-reliability tradeoffs.

Figure 2:
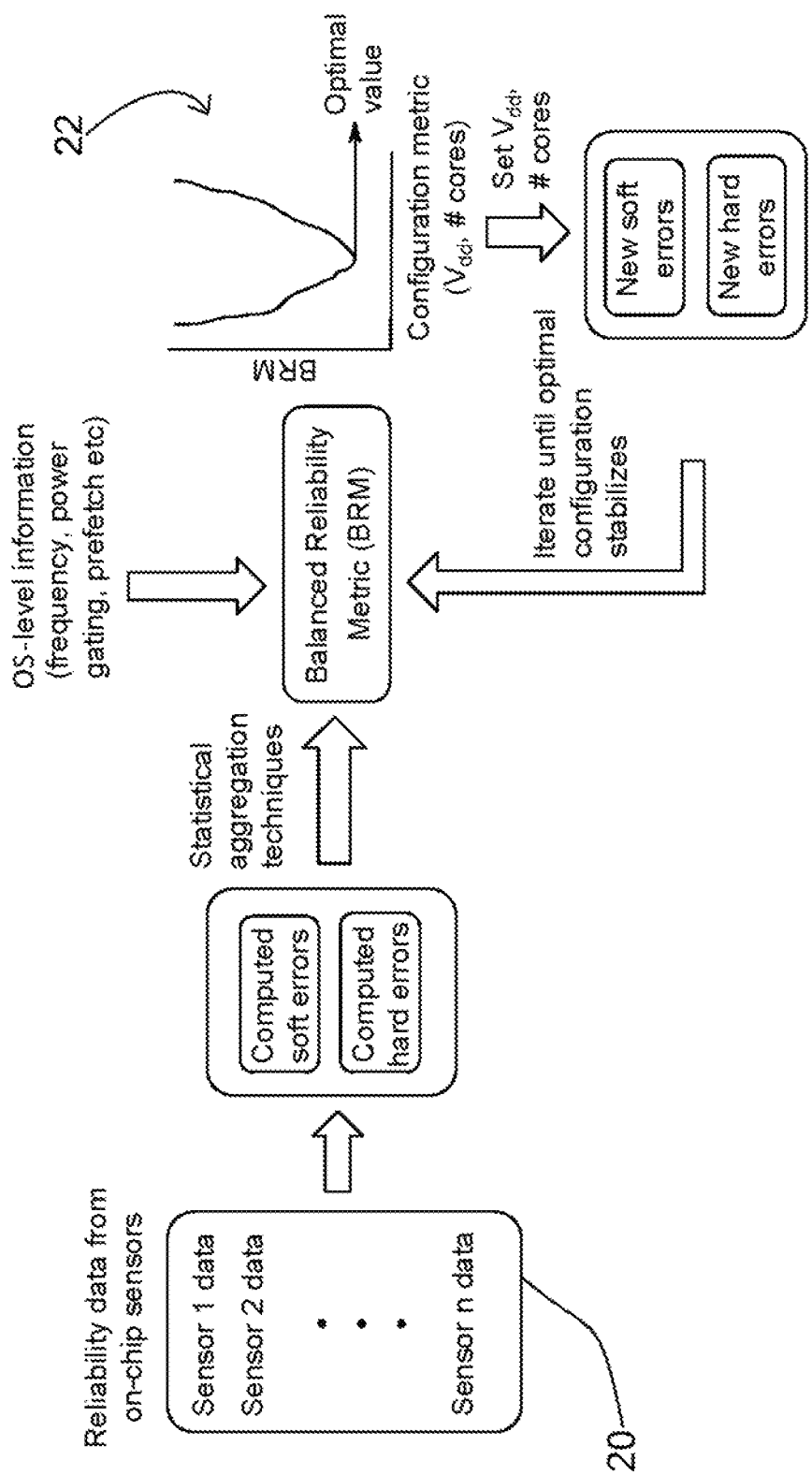
FIG. 2 is a schematic representation of a system and algorithm for the determination of a balanced reliability metric according to an exemplary embodiment of the present disclosure.
Figure 3:
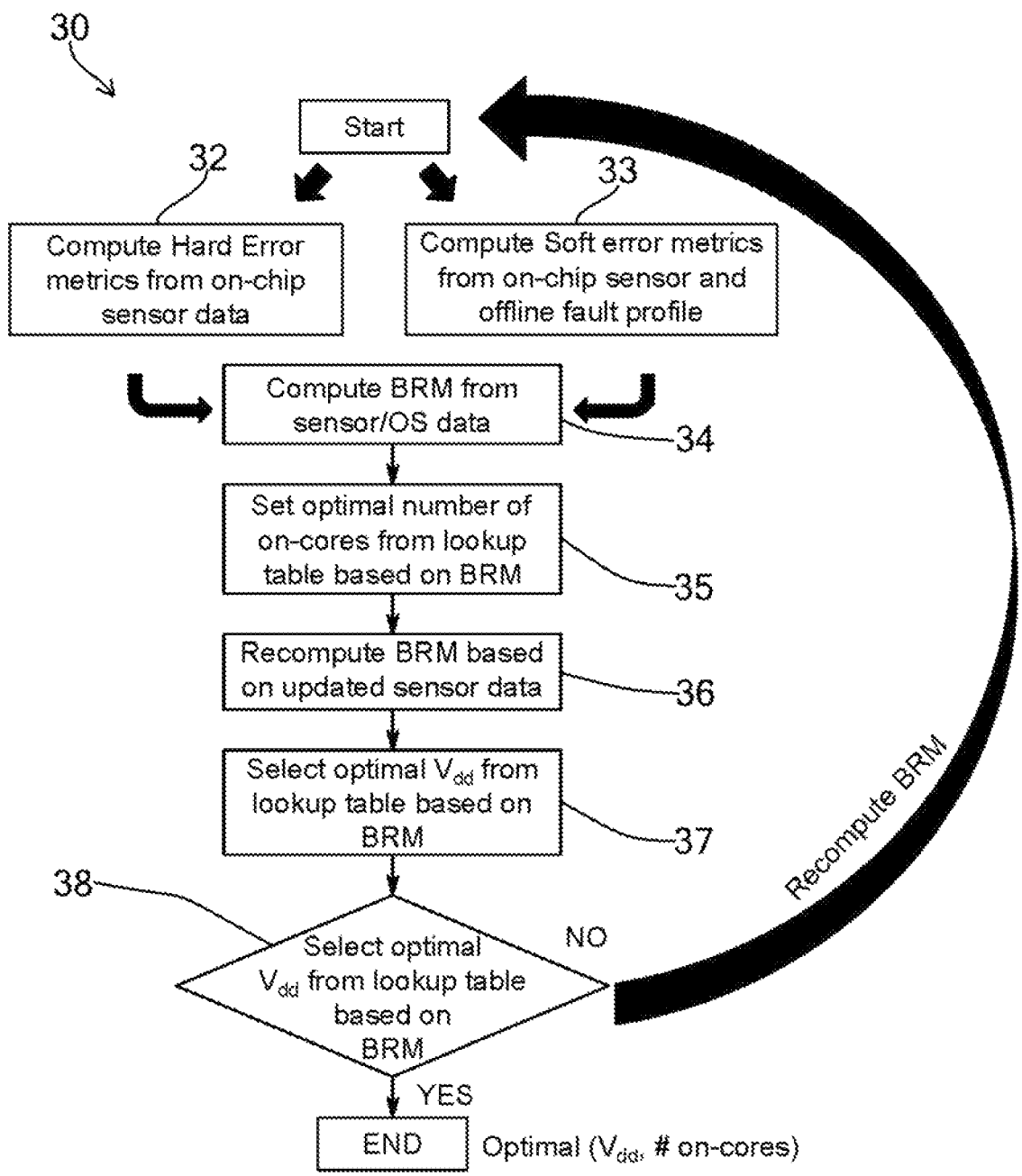
FIG. 3 is a flowchart illustrating a method for determining an optimal processor configuration according to an exemplary embodiment of the present disclosure.

Referring to FIGS. 2 and 3, a method 30 according to an embodiment of the present disclosure is illustrated. Method 30 is illustrated as a collection of blocks in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the method 30 is described with reference to schematic representation of a system and algorithm of FIG. 2.

A plurality of on-chip sensors 20 may include data from sensor 1, sensor 2, . . . sensor n, as illustrated in FIG. 2. In block 32, hard error metrics may be computed from on-chip sensor data. In step 33, soft effort metrics may be computed from on-chip sensor data as well as from an offline fault profile. Through statistical aggregation techniques, such as principal component analysis (PCA), a balanced reliability metric (BRM) can be calculated from this sensor and operating system data in step 34. The optimal number of on-cores can be determined from a lookup table based on the BRM in step 35. In step 36, the BRM may be recomputed based on updated sensor data and an optimal $V_{dd}$ can be selected from a lookup table based on the BRM in step 36. Reiteration of this process can occur until the optimal configuration stabilizes. A graph 22 may result where the optimal BRM can be determined as a curve minimum, where the optimal BRM corresponds to a given $V_{dd}$ and number of on-cores.

Figure 4:
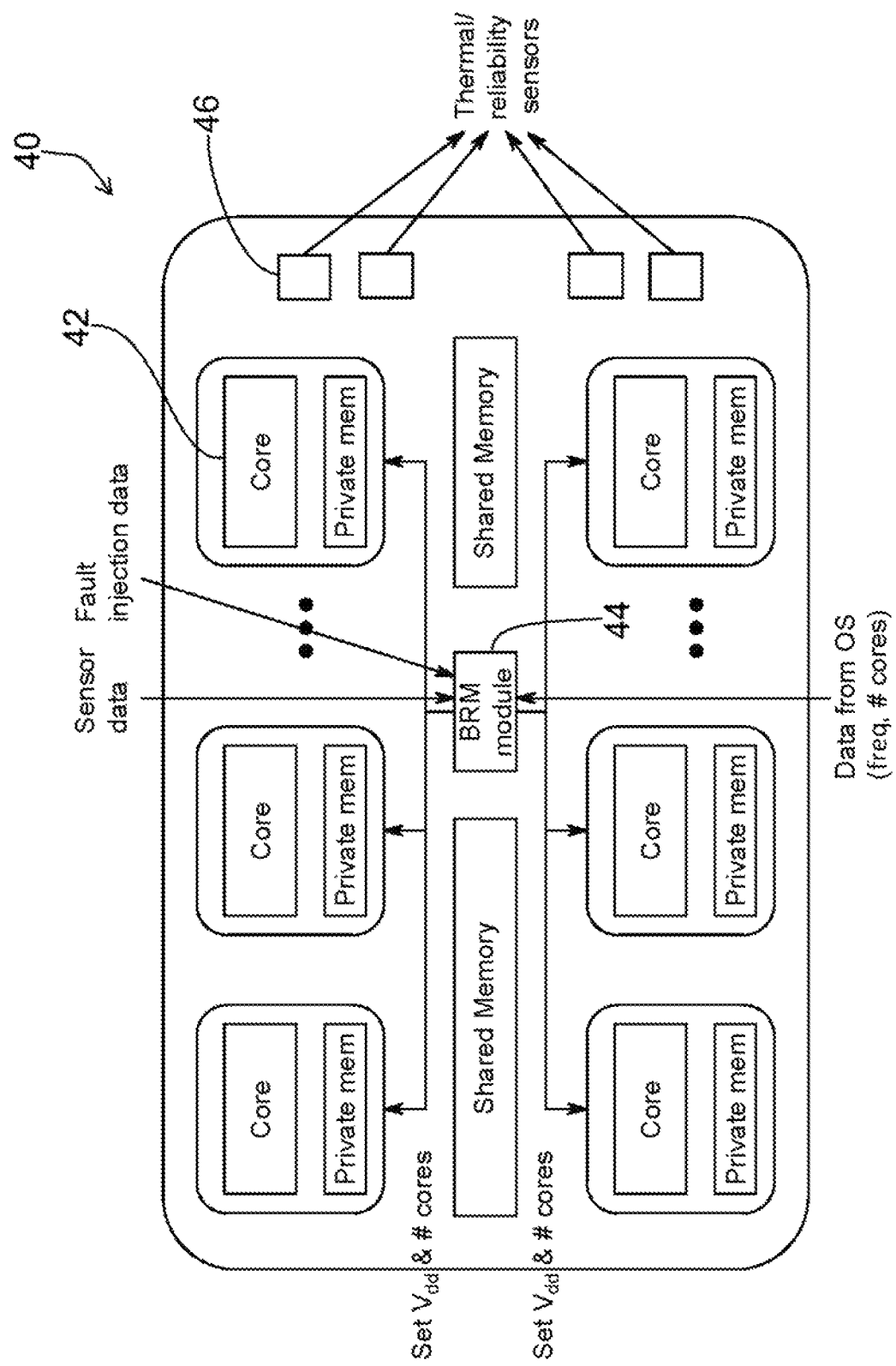
FIG. 4 illustrates an implementation of a balanced reliability metric module into a processor according to an exemplary embodiment of the present disclosure.

Referring to FIG. 4, an exemplary processor configuration 40, including a plurality of cores 42, is shown. A BRM module 44 may be incorporated into the processor configuration 40 to perform the methods as described in the present disclosure. Sensor data, including data from thermal/reliability sensors 46, fault injection data and data from the operating system, such as frequency, number of cores, power gating information, and the like, may be fed to the BRM module 44. The BRM module 44 may perform aspects of the methods and algorithms as described herein to set the $V_{dd}$ and number of on-cores to determine a reliability-aware runtime optimal processor configuration. The determination of the optimal $V_{dd}$ and number of on-cores may vary on an application basis or even on an application phase basis, where the BRM module 44 may process data to periodically or continually update the optimal processor configuration.

Figure 5:
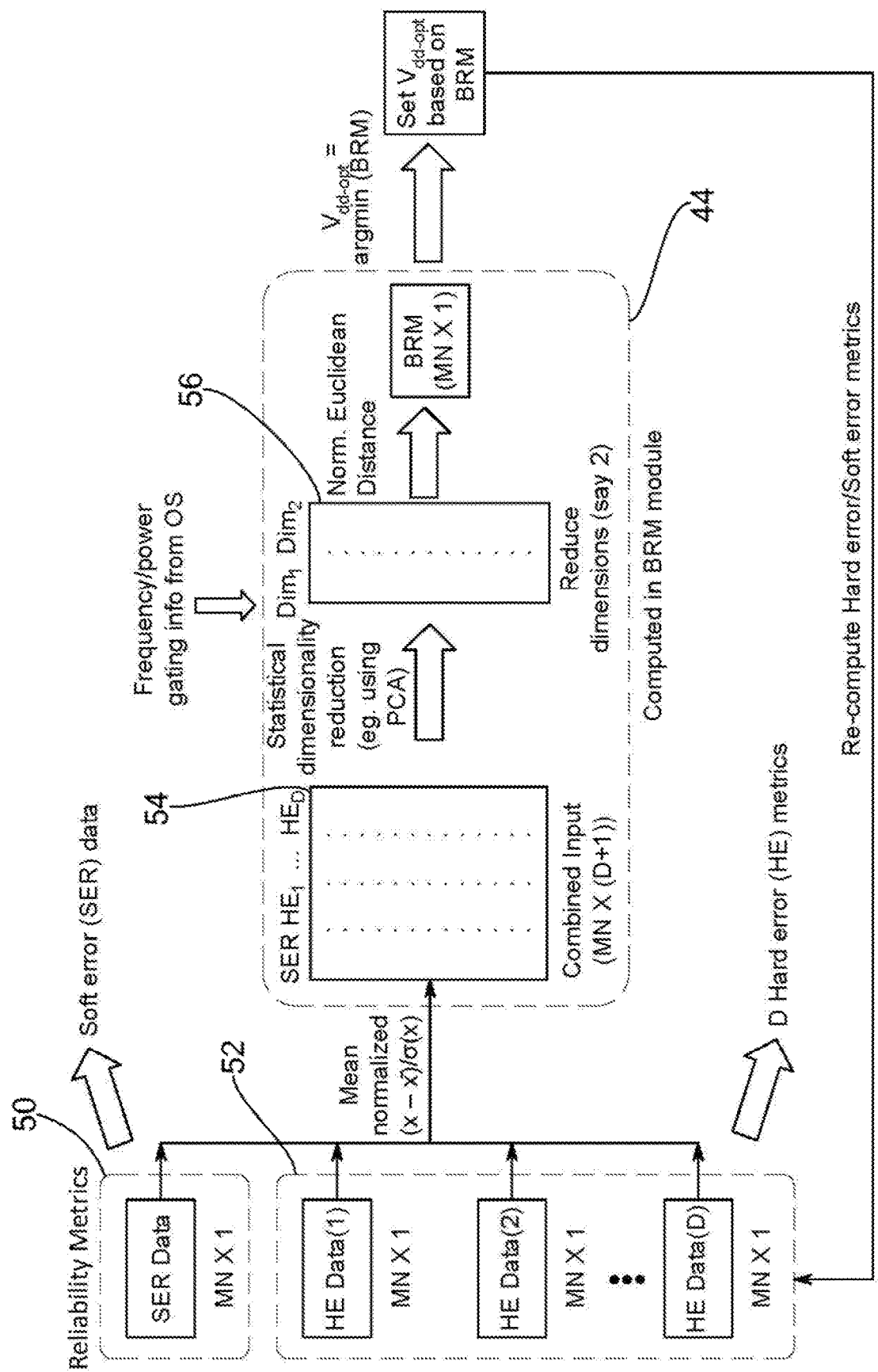
FIG. 5 illustrates a detailed program flow for computing the balanced reliability metric according to an exemplary embodiment of the present disclosure.

Referring now to FIG. 5, further details are provided to illustrate methods according to exemplary embodiments of the present disclosure. The reliability metrics, including soft error (SER) data 50 and hard error (HE) data 52 may be fed to the BRM module 44 as a mean normalized multidimensional vector. The combined input may be a MN×(D+1) matrix 54, also referred to as an input register 54, where M is the number of workloads and N is the number of voltage/frequency states. Statistical dimensionality reduction may be performed by processes, such as principal component analysis, as one such example, to reduce the matrix from an MN×(D+1) input matrix to an MN×P matrix, where P<<D. In some embodiments, the matrix may be reduced to a two-dimensional array 56. A norm or distance metric, such as a Euclidean distance, or L2 norm, may be determined to calculate the BRM. The $V_{dd}$ and the on-core count is calculated as an argmin (BRM), as illustrated in the graph 22 of FIG. 2. The SER and HE may be re-computed, and the process continued.

Figure 6:
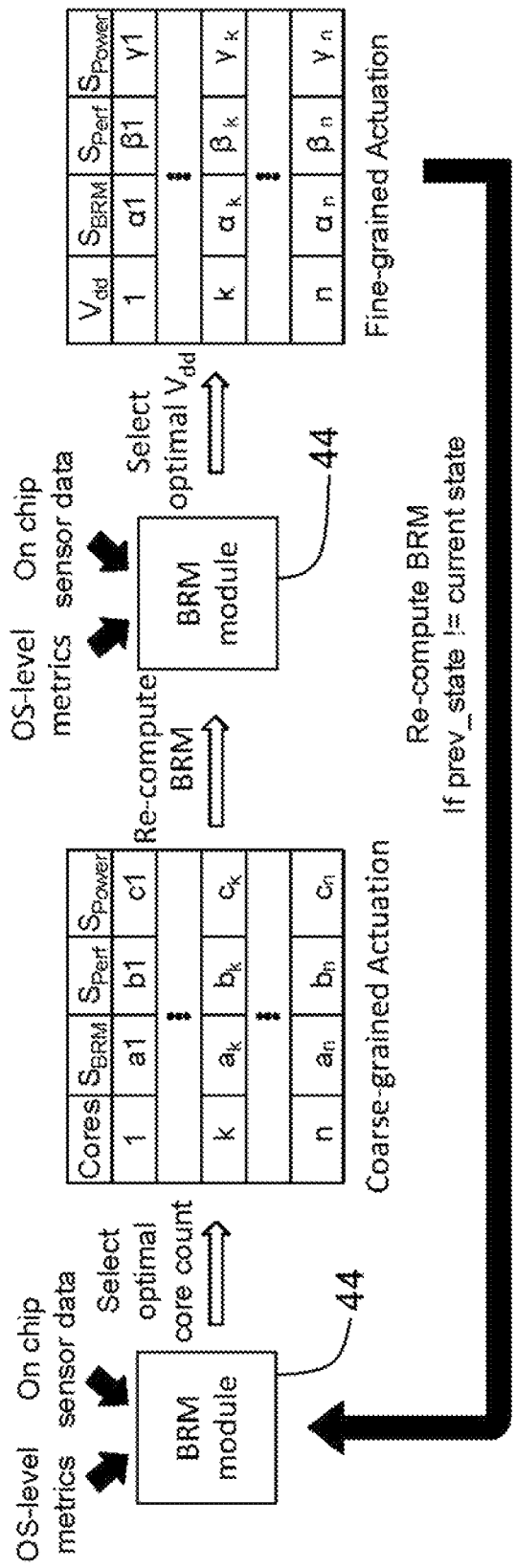
FIG. 6 is a representation of methods of coarse and fine-grained actuation techniques for optimization of the balanced reliability metric according to an exemplary embodiment of the present disclosure.

Referring to FIG. 6, in some embodiments, the BRM module 44 may perform coarse-grained actuation and fine-grained actuation. In coarse-grained actuation, an optimal core count may be determined based on power and performance requirements of an application. The BRM module 44 may then re-compute the BRM and then, in fine-grained actuation, select an optimal Vdd. If the previous state is not equal to the current state (argmin (BRM) has not been reached), then the process may be repeated, where the BRM is recalculated and the optimal core count is selected.

Figure 7A:
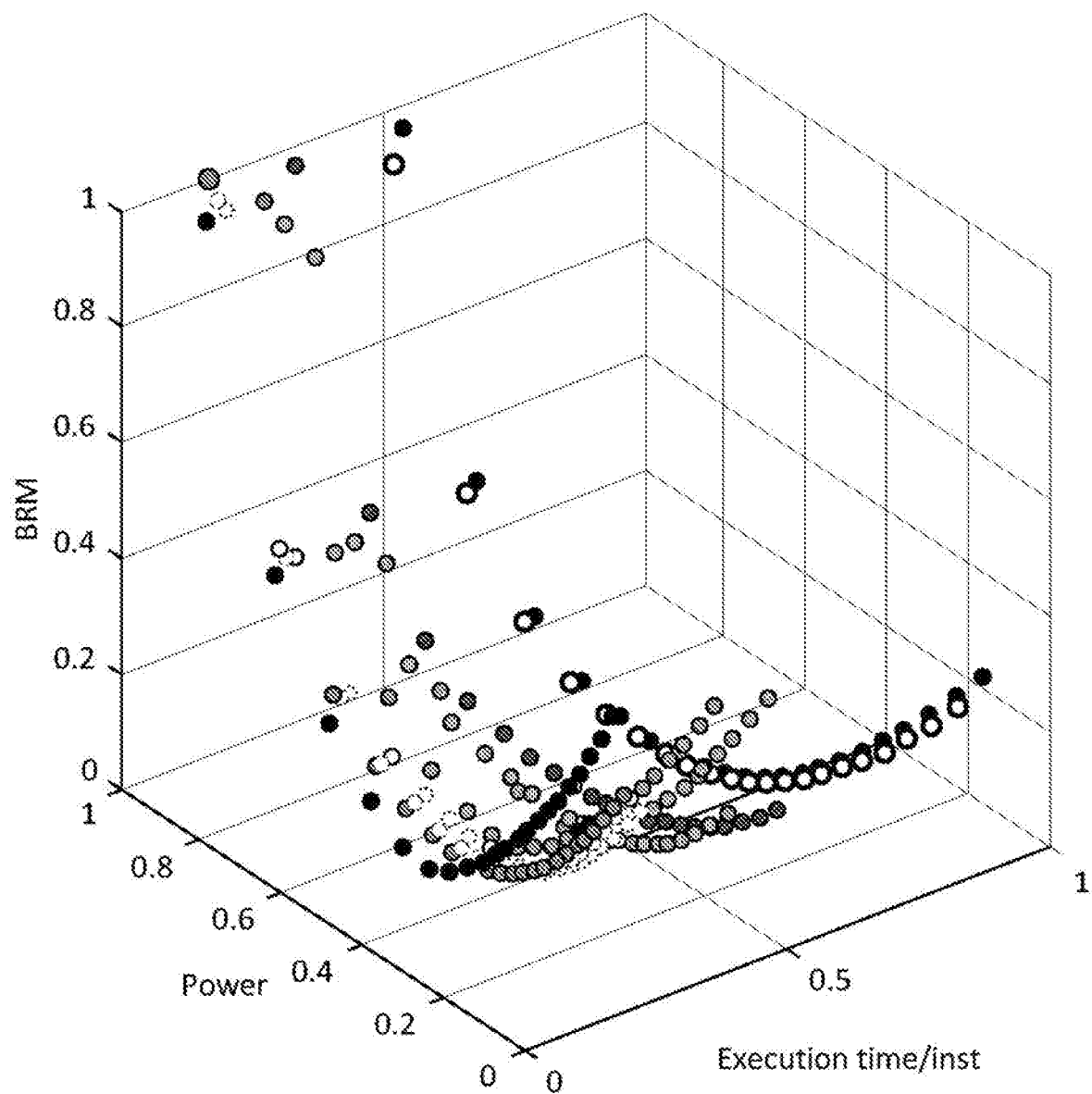
FIG. 7A is a graph illustrating the determination of optimal reliability points for various applications.
Figure 7B:
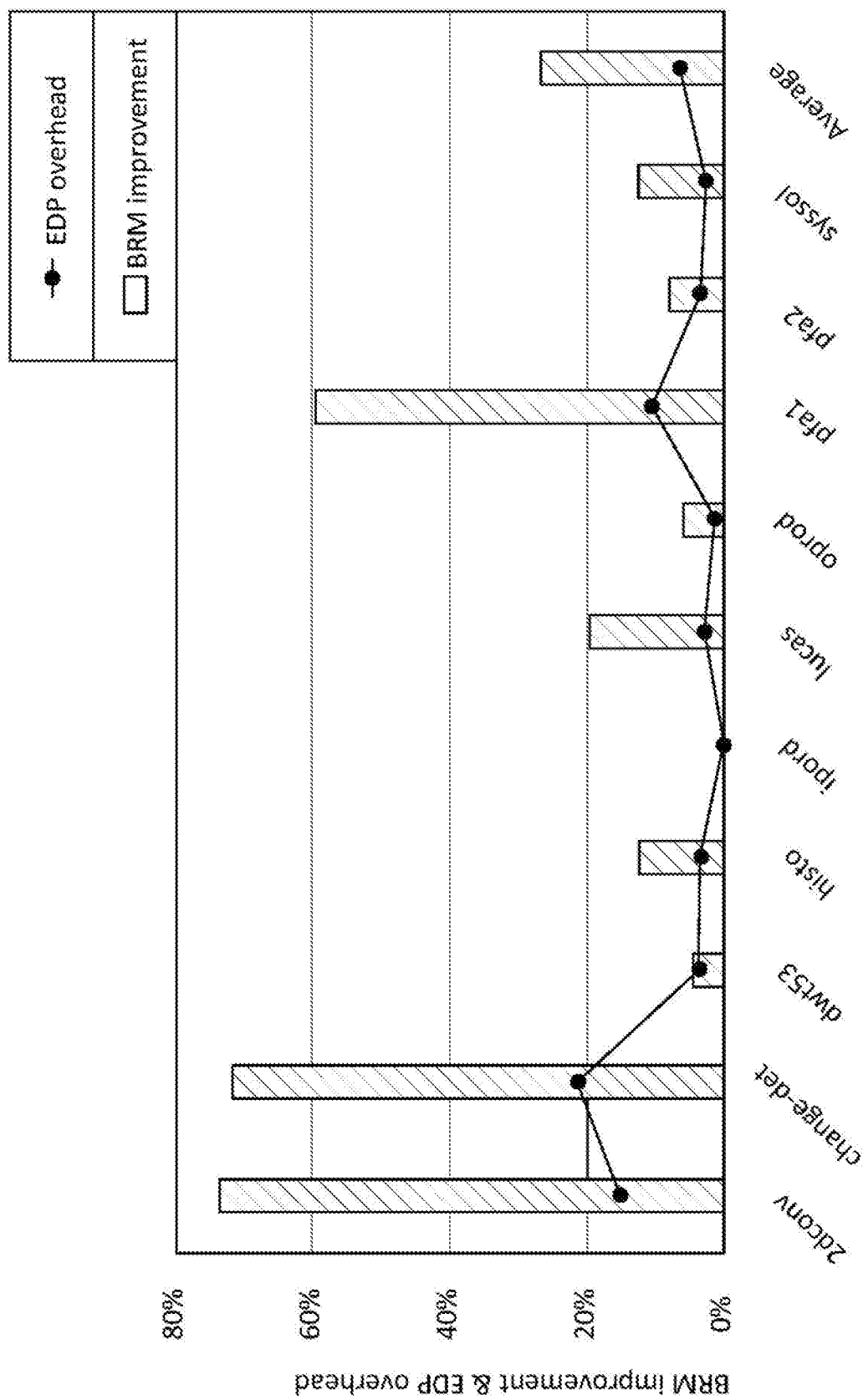
FIG. 7B is a graph illustrating energy-reliability tradeoffs between optimal reliability-optimal and EDP-optimal operation.

FIGS. 7A and 7B show results that highlight the proof-of-concept for the system and methods for determining reliability-aware runtime optimal processor configuration, as discussed in detail above. The data points of FIG. 7A show how the BRM, power and execution time for various applications are determined where, like the graph 22 of FIG. 2, a minimum value is determinative of the optimal reliability point. FIG. 7B shows the energy-reliability tradeoffs between an EDP-optimal operation (EDP overhead) and optimal reliability operation (BRM improvement) for a plurality of different applications.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
   integrating soft error data and hard error data into a single metric within a metric module; and
   adjusting at least one of a voltage of a processor and a number of on-cores of the processor to optimize overall reliability of the processor, wherein the metric module uses a statistical dimensionality reduction technique to convert a combined input of the soft error data and the hard error data into a reduced dimensional array.

2. The method of claim 1, wherein the metric module uses a distance metric to determine the single metric.

3. The method of claim 1, further comprising re-computing the single metric based on the adjusting of at least one of the processor voltage and the number of on-cores and a re-computation of the soft error data and the hard error data.

4. The method of claim 3, further comprising selecting a minimum value of the single metric to determine an optimal processor voltage to optimize reliability of the processor.

5. The method of claim 1, further comprising:
   performing a coarse-grained actuation by adjusting the number of on-cores based on operating system level metrics and sensor data;
   recomputing the single metric to determine a recomputed single metric; and performing a fine-grained actuation by adjusting the processor voltage based on the operating system level metrics and the sensor data.

6. The method of claim 5, further comprising:
recalculating the single metric to determine a recalculated single metric;
comparing the recomputed single metric with the recalculated single metric; and,
upon determining that the recomputed single metric is different from the recalculated single metric, based on the comparison, repeating the coarse-grained actuation and the fine-grained actuation.

7. A method, comprising:
integrating soft error data and hard error data into a single metric within a metric module;
performing a coarse-grained actuation by adjusting a number of on-cores of a processor based on operating system level metrics and sensor data;
recomputing the single metric to determine a recomputed single metric; and
performing a fine-grained actuation by adjusting the processor voltage based on the operating system level metrics and the sensor data, wherein the metric module uses a statistical dimensionality reduction technique to convert a combined input of the soft error data and the hard error data into a reduced dimensional array.

8. The method of claim 7, wherein the metric module uses a distance metric to determine the single metric.

9. The method of claim 7, further comprising re-computing the single metric based on the adjusting of at least one of the processor voltage and the number of on-cores.

10. The method of claim 9, further comprising selecting a minimum value of the single metric to determine an optimal processor voltage and an optimal number of on-cores to optimize reliability of the processor.

11. The method of claim 7, further comprising re-integrating soft error data and hard error data to re-calculate the single metric.

12. A non-transitory computer program product, comprising:
a computer readable storage medium having program instructions embodied therewith, the program instructions executable by a balanced reliability metric module to cause the balanced reliability metric module to:
integrate soft error data and hard error data into a single metric;
adjust at least one of a voltage of a processor and a number of on-cores to optimize overall reliability of the processor; and
convert a combined input of the soft error data and the hard error data into a reduced dimensional array using a statistical dimensionality reduction technique.

13. The non-transitory computer program product of claim 12, wherein execution of the program instructions further causes the balanced reliability metric module to determine the single metric using a distance metric.

14. The non-transitory computer program of claim 12, wherein execution of the program instructions further causes the balanced reliability metric module to re-compute the single metric based on the adjusting of at least one of the processor voltage and the number of on-cores and a re-computation of the soft error data and the hard error data.

15. The non-transitory computer program of claim 14, wherein execution of the program instructions further causes the balanced reliability metric module to select a minimum value of the single metric to determine an optimal processor voltage to optimize reliability of the processor.

16. The non-transitory computer program of claim 12, wherein execution of the program instructions further causes the balanced reliability metric module to:
perform a coarse-grained actuation by adjusting the number of on-cores based on operating system level metrics and sensor data;
recompute the single metric to determine a recomputed single metric; and
perform a fine-grained actuation by adjusting the processor voltage based on the operating system level metrics and the sensor data.

17. The non-transitory computer program of claim 16, wherein execution of the program instructions further causes the balanced reliability metric module to:
recalculate the single metric to determine a recalculated single metric; and
upon determining that the recomputed single metric is different from the recalculated single metric, repeating the coarse-grained actuation and the fine-grained actuation.

* * * * *